United States Patent [19]

Sano et al.

[11] Patent Number: 4,567,106

[45] Date of Patent: Jan. 28, 1986

[54] METHOD OF FORMING A COATING ON POLYOLEFIN SUBSTRATE

[75] Inventors: Takashi Sano; Kazuo Kawabata, both of Kyoto; Yoji Miya, Shimamotocho, all of Japan

[73] Assignee: Dai-Ichi Kogyo Seiyaku Co., Ltd., Kyoto, Japan

[21] Appl. No.: 707,129

[22] Filed: Mar. 1, 1985

[30] Foreign Application Priority Data

Mar. 7, 1984 [JP] Japan ................................ 59-44733

[51] Int. Cl.$^4$ ........................ B32B 27/38; B05D 3/02; B32B 27/40
[52] U.S. Cl. .................................... 428/413; 427/40; 427/223; 427/301; 427/322; 427/316; 427/385.5; 427/412.3; 428/423.3; 428/424.8
[58] Field of Search .................. 427/412.3, 385.5, 301, 427/40, 223, 316, 322, 386; 428/424.8, 423.3, 413

[56] References Cited

U.S. PATENT DOCUMENTS

| | | | |
|---|---|---|---|
| 3,023,126 | 2/1962 | Underwood et al. | 427/412.3 X |
| 3,695,918 | 10/1972 | Ward | 427/412.3 X |
| 3,900,616 | 8/1975 | Moore | 427/385.5 |
| 4,246,319 | 1/1981 | Jacobone | 428/413 |
| 4,268,578 | 5/1981 | Bordini et al. | 428/413 |

FOREIGN PATENT DOCUMENTS 0932652  7/1963  United Kingdom ............ 427/412.3

*Primary Examiner*—Thurman K. Page
*Attorney, Agent, or Firm*—Millen & White

[57] ABSTRACT

A method of forming a coating on a polyolefin substrate comprising the steps of applying a primer coating onto the substrate and then applying a finish coating is disclosed. The method is characterized in that the primer coating consists essentially of a polyurethane prepolymer derived from a polypropylene glycol having a molecular weight from about 400 to about 2,000 and an excess of diphenylmethane diisocyanate.

11 Claims, No Drawings

METHOD OF FORMING A COATING ON POLYOLEFIN SUBSTRATE

BACKGROUND OF THE INVENTION

This invention relates to a method of forming a coating on a polyolefin substrate.

Polyolefin resins such as polyethylene, polypropylene and the like have been widely used for protective and anticorrosive purposes of iron and other metallic substrates owing to their low water-absorption and low moisture-permeability characteristics and their high anticorrosive properties. However, their adhesion to the same or different resins is very poor and thus repairing or finishing imperfections on the polyolefin surfaces are possible only with unsatisfactory results. Such imperfections may be repaired, for example, by applying a polyolefin sheet onto the polyolefin surface and fusing together. This method is not satisfactory because the resulting coating film tends to peel off from the applied surface due to the difference in thermal expansion coefficient between the resin and metals.

Various primer coating compositions are known for improving adhesion characteristics of finish coats to be applied on polyolefin substrates. However, none of known primer compositions can achieve satisfactory results.

Thus, there is a long-felt but unfilled need for a primer coating composition which can greatly improve the bonding strength of a coating film to polyolefin substrates.

SUMMARY OF THE INVENTION

According to the present invention, there is provided a method of forming a coating on a polyolefin substrate comprising the steps of applying a primer coating onto said substrate and then applying a finish coating thereon. The method is characterized in that the primer coating consists essentially of a polyurethane prepolymer containing a pluraliity of terminal free isocyanato groups derived from a polypropylene glycol having a molecular weight from about 400 to about 2,000 and an excess of diphenylmethane diisocyanate. An NCO/OH equivalent ratio of 1.2 to 4.0 is preferable.

Preferably, the polyolefin substrate is, prior to the application of the primer, subjected to a conventional surface treatment such as flame treatment, corona discharge treatment or bichromate/sulfuric acid treatment to chemically alter polyolefin surfaces.

DETAILED DESCRIPTION OF THE INVENTION

Polypropylene glycols (hereinafter referred to as "PPG") are conventionally produced by polymerizing propylene oxide in the presence of an alkaline catalyst. For the purpose of this invention, the molecular weight of PPG must range between about 400 and about 2,000. If the molecular weight is too low, the prepolymer tends to cure into a rigid or brittle layer which is liable to cracking upon exerting mechanical impacts thereon. Conversely, if the molecular weight is too high, the resulting primer layer is too flexible and thus the adhesion of primer layer to the substrate does not reach the desired lever. More preferably, PPG has a molecular weight from about 600 to about 1,500.

Diphenylmethane diisocyanate (hereinafter referred to as "MDI") is commercially available in various forms such as pure, crude and liquid forms. Any form of MDI may be used. It is surprising that only MDI reacts with PPG to give a prepolymer which may be used for the purpose of this invention with satisfactory results. Other conventional diisocyanates such as toluylene diisocyanate (TDI), hexamethylene diisocyanate (HMDI) and the like do not accomplish the purpose of the present invention. This is postulated that the prepolymer derived from MDI is more reactive and has a higher cohesive force than the prepolymers derived from other diisocyanates.

The prepolymer is prepared by reacting PPG with an excess of MDI at an NCO/OH equivalent ratio preferably from 1.2 to 4.0. If the NCO/OH equivalent ratio is too low, the resulting prepolymer is too viscous and thus hardly applicable as a primer coat onto the substrate. Conversely, if the ratio is too high, the resulting prepolymer tends to cure into a rigid polyurethane layer which is liable to cracking upon exerting mechanical impacts thereon and also contains a number of small bubbles or voids.

If necessary, the prepolymer may be diluted with an inert solvent such as toluence, xylene, ethyl acetate, butyl acetate, methylene chloride, trichloroethane and the like to a suitable viscosity range and applied on the polyolefin substrate by a conventional technique.

The prepolymer may be cured by applying onto the substrate and allowing to react with water in the atmosphere at ambient temperature. Since the prepolymer is one-component, its application time is not limited to a pot-life encountered in two-components polyurethane compositions. The curing time may be accelerated by the use of a catalyst. Examples of usable catalysts include tertiary amines such as triethylamine, triethylenediamine, N,N-dimethylethanolamine, N,N,N', N'-tetramethylethylenediamine, N-methyl-morpholine and the like; organotin compounds such as dibutyltin dilaurate, dibutltin diacetate, stannous octoate and the like.

Examples of polyolefins include polyethylene, polypropylene, polybutadiene and the like. Modified polyolefins, i.e. copolymers of an olefin with minor amounts of a comonomers such as vinyl acetate, styrene or acrylonitrile, and copolymers olefins such as ethylene-propylene rubber may also be used.

Preferably, the surface of polyolefin substrates is subjected to a conventional surface treatment such as flame treatment, corona discharge treatment or bichromate/sulfuric acid treatment prior to the application of the primer coating. The flame treatment is suitable for treating relatively thick polyolefin films, while the corona discharge treatment is suitable for relatively thin polyolefine films.

Finish coatings may be applied after the primer has been cured tack-free. Epoxy-based or polyurethane-based finish coatings are preferable.

Thus, the primer coating according to the present invention may be easily applied and retain a strong adhesion to polyolefin surfaces even under wet or elevated temperature conditions for a long period of time.

The invention is further illustrated by the following examples in which all parts and percents are by weight.

EXAMPLES 1-3 and COMPARATIVE EXAMPLES 1-3

PPG and diisocyanate in the amounts specified in Table I were reacted in a 1 liter flask at 90°-100° C. until the free isocyanate content of the resulting prepolymer decreased to the specified value. When the viscosity was too high, the reaction mixture was diluted with toluene.

A specimen made of low-density polyethylene was subjected to flame treatment, given a thin coating of the prepolymer and dried tack-free under the specified condition.

A two-components polyurethane coating composition sold by Dai-Ichi Kogyo Seiyaku Co, Ltd, Kyoto, Japan under the name of "MacFlex 105" was applied onto the specimen and allowed to cure at room temperature for 7 days. The T type peel strength of the coating film was tested by means of an autograph tension tester at a speed of 50 mm/minute.

Table I shows the results of Examples 1-3 and Comparative Examples 1-3.

The above has been offered for illustrative purposes only, and it is not for the purpose of limiting the scope of this invention which is defined in the claims below.

We claim:

1. In a method of forming a coating on a polyolefin substrate comprising the steps of applying a primer coating onto the substrate and then applying a finish coating thereon, the improvement wherein said primer coating consists essentially of a polyurethane prepolymer containing a plurality of terminal free isocyanate groups derived from a polypropylene glycol having a molecular weight from about 400 to about 2,000 and an excess of diphenylmethane diisocyanate.

2. The method of claim 1, wherein said polypropylene glycol has a molecular weight from about 600 to about 1,500.

TABLE I

|  | Example | | | Comparative Example | | |
|---|---|---|---|---|---|---|
|  | 1 | 2 | 3 | 1 | 2 | 3 |
| PPG | | | | | | |
| M.W. | 750 | 1200 | 750 | 750 | 3000 | — |
| Amount (parts) | 36.8 | 37.2 | 38.8 | 41.5 | 76.6 | — |
| Diisocyanate (Parts) | | | | | | |
| Crude MDI | 23.2 | 22.8 | — | — | 23.4 | — |
| Liquid MDI | — | — | 21.2 | — | — | — |
| TDI | — | — | — | 18.5 | — | — |
| Toluene (parts) | 40 | 40 | 40 | 40 | — | — |
| Drying condition | 4 hrs. 20° C., 50% RH | 24 hrs. 20° C., 50% RH | 4 hrs. 20° C., 50% RH | 4 hrs. 20° C., 50% RH | 4 hrs. 20° C., 50% RH | — |
| Peel strength (Kg/25 mm) | 9.34 | 8.37 | 8.33 | 0.48 | 1.50 | 2.04 |
| Free NCO content (%) | 5 | 7 | 3 | 7 | 5 | — |
| Remarks | 0.1% Dibutyltin dilaurate | | 0.1% Dibutyltin dilaurate | 0.1% Dibutyltin dilaurate | 0.1% Dibutyltin dilaurate | No primer coating |

EXAMPLE 4

The peel strength of the coating film of Example 1 was tested at varying temperatures. Table II shows the results indicating that the strength is retained at a sufficient level up to 60° C.

TABLE II

| Temperature (°C.) | Peel strength (Kg/25 mm) |
|---|---|
| 25 | 11.9 |
| 40 | 7.5 |
| 60 | 5.0 |
| 80 | 1.9 |

EXAMPLE 5

The coated specimen of Example 1 was soaked in distilled water or 3% saline at 50° C. and at 80° C., respectively. The change of the peel strength against time was observed. Table III tabulates the results showing that the peel strength is retained at a sufficient level is distilled water and saline.

TABLE III

| Soaking time (month) | Distilled water | | 3% Saline | |
|---|---|---|---|---|
|  | at 50° C. | at 80° C. | at 50° C. | at 80° C. |
| 1 | 12.2 | 11.3 | 11.8 | 11.0 |
| 2 | 11.7 | 10.0 | 11.7 | 10.8 |
| 3 | 11.3 | 10.3 | 11.5 | 10.8 |

3. The method of claim 1, wherein the NCO/OH equivalent ratio of said prepolymer ranges from 1.2 to 4.0.

4. The method of claim 3 further comprising the step of subjecting the polyolefin substrate to flame treatment, corona discharge treatment or bichromate/sulfuric acid treatment prior to the application of said primer coating.

5. The method of claim 4, wherein said finish coating is an epoxy based or polyurethane based coating.

6. The method of claim 5, wherein said primer coating comprising a catalytically effective amount of a tertiary amine or organotin compound.

7. A plastic article comprising a polyolefin substrate having on a surface therefore a two-coat coating comprising a primer and a finish coat and produced according to the process of claim 1.

8. An article according to claim 7 wherein the finish coating is an epoxy based or polyurethane based coating.

9. An article according to claim 7 wherein the polyolefin substrate is low-density polyethylene.

10. An article according to claim 7 wherein the polyolefin substrate is low-density polyethylene and wherein the finish coating is an epoxy based or polyurethane based coating.

11. A plastic article comprising a low density polyethylene substrate having on the surface thereof a two-coat coating comprising a polyurethane primer coat and an epoxy or polyurethane based finish coat and produced according to the process of claim 4.

* * * * *